Aug. 27, 1935.  D. W. BERLIN  2,012,652

AUTOMATICALLY VARIABLE CHANGE SPEED GEAR DEVICE

Filed Dec. 26, 1933  3 Sheets-Sheet 1

D. W. Berlin
INVENTOR

By Marks & Clerk
Attys.

Aug. 27, 1935.   D. W. BERLIN   2,012,652
AUTOMATICALLY VARIABLE CHANGE SPEED GEAR DEVICE
Filed Dec. 26, 1933   3 Sheets-Sheet 2
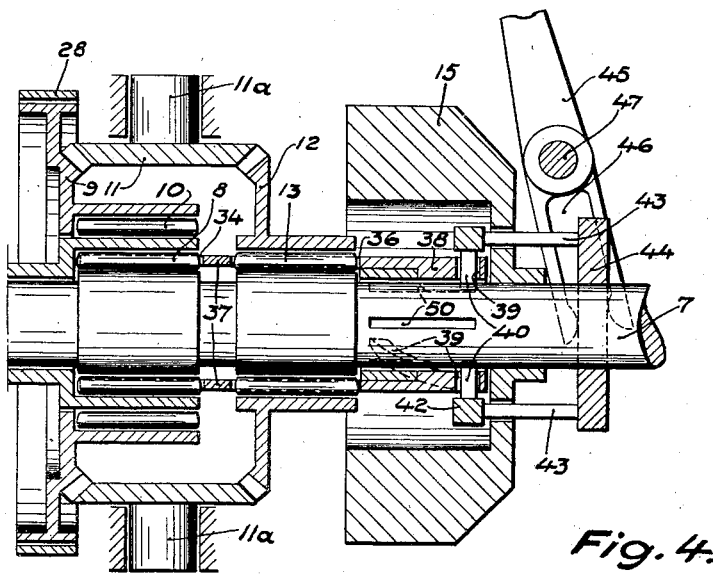
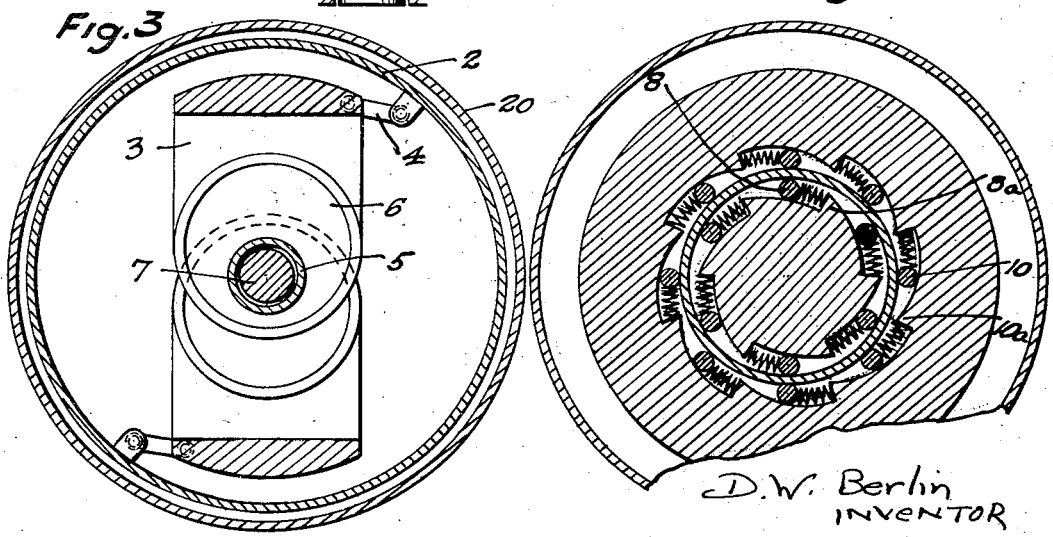
D. W. Berlin
INVENTOR
By: Marks & Clerk
Att'ys.

Aug. 27, 1935.　　　D. W. BERLIN　　　2,012,652
AUTOMATICALLY VARIABLE CHANGE SPEED GEAR DEVICE
Filed Dec. 26, 1933　　　3 Sheets—Sheet 3
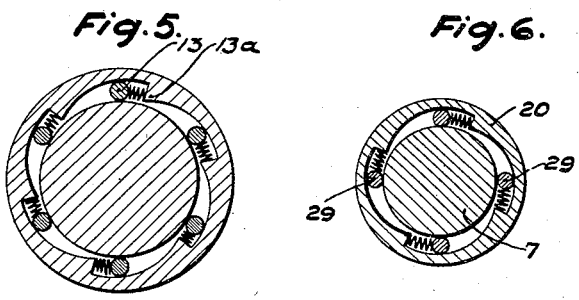
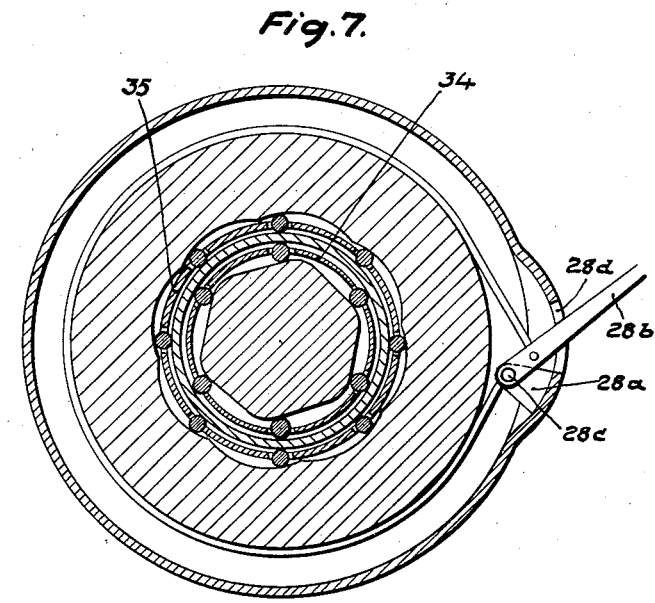
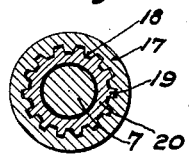
D. W. Berlin
INVENTOR Patented Aug. 27, 1935

2,012,652

UNITED STATES PATENT OFFICE 2,012,652

AUTOMATICALLY VARIABLE CHANGE SPEED GEAR DEVICE

David Werner Berlin, Rasunda, Sweden

Application December 26, 1933, Serial No. 704,004
In Sweden July 5, 1933

14 Claims. (Cl. 74—64)

This invention relates to an automatically variable change speed gear device according to the centrifugal weight principle for automobiles and other similar craft and for other purposes where an automatically variable power transmission is desirable. The many requirements at the present time of an automatic automobile gear are met by this invention, as is clear from the points stated below:

1. The device governs the gearing of the motor power entirely automatically from direct coupling to the driving moment of torsion necessary to overcome an increased resistance, for instance when starting or on an upward slope.

2. The gear returns entirely automatically from gearing to direct coupling when the resistance decreases or ceases.

3. By this device the motor may be accelerated from any speed to its highest speed.

4. Through this device the automobile may be braked by the motor in every situation at forward motion.

5. This device operates entirely automatically at forward as well as backward motion.

Further, the invention means that the centrifugal weights and the flywheel masses with the least weight obtain their highest effect, and thus the material is not subjected to overload. The manner, in which the centrifugal weights affect the operation, is due to their small weight, which, in its turn, enables acceleration of the motor by changing the mutual manner of operation of the centrifugal weights.

The gear according to this invention operates according to the centrifugal weight principle in the manner that on engagement the positive as well as the negative impulses of the centrifugal weights separately actuate the driven shaft in the direction of rotation of the same. An important feature of the invention consists therein that the positive impulse is transmitted directly to the driven shaft by means of a primary check coupling, and the negative impulse by means of a primary and a secondary check coupling. Hence it follows as an important advantage that the moment of force in direct motion is transmitted from the driving shaft to the driven shaft by means of the primary check coupling for the positive impulse, whereas the primary as well as the secondary check coupling for the negative impulse is at rest. On engagement the positive impulse is transmitted directly by the primary check coupling of the same to the driven shaft, while the negative impulse by the primary check coupling of the same is first transmitted to the members, which direct the movement in the positive direction, and then by means of the secondary check coupling is transmitted to the driven shaft. When accelerating the driving shaft the positive impulse is directly transmitted to the driven shaft, while the negative impulse by braking or checking is prevented from actuating the driven shaft during the negative stroke and instead thereof is utilized to accelerate the speed of the driving shaft.

The braking of the driven shaft by the driving shaft takes place when the driven shaft tends to attain a higher speed than the driving shaft since then the shafts are automatically connected with each other by a check coupling so that the driving shaft acts as a brake on the driven shaft according as the speed of the former is reduced. In order to make the gear as noiseless as possible the noise producing members are insulated from the surroundings by a suitable insulating material, which may be an organic or inorganic substance or a metal.

The invention is illustrated in the accompanying drawings, in which

Figs. 3–8 are cross sections of the said embodiments.

Figure 2:
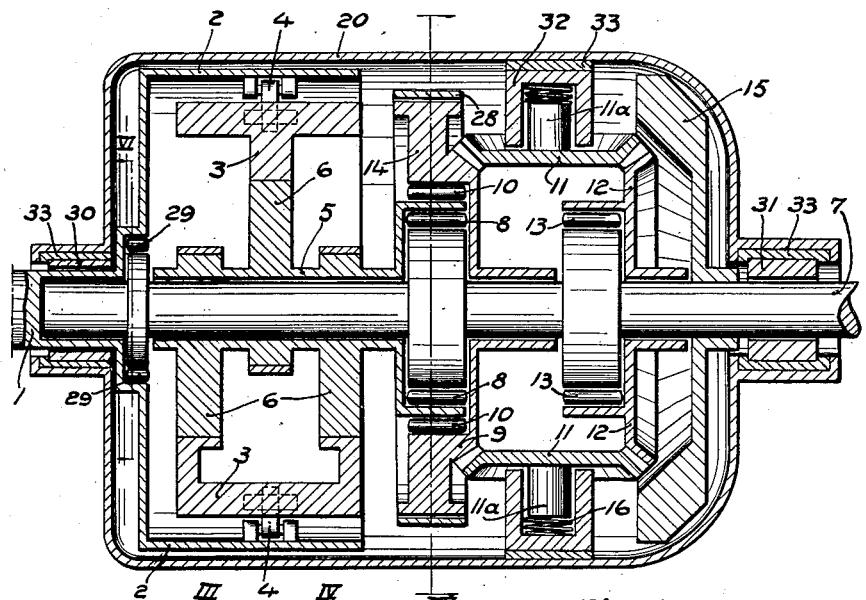
Fig. 2 is an axial section of another embodiment.
Figure 1:
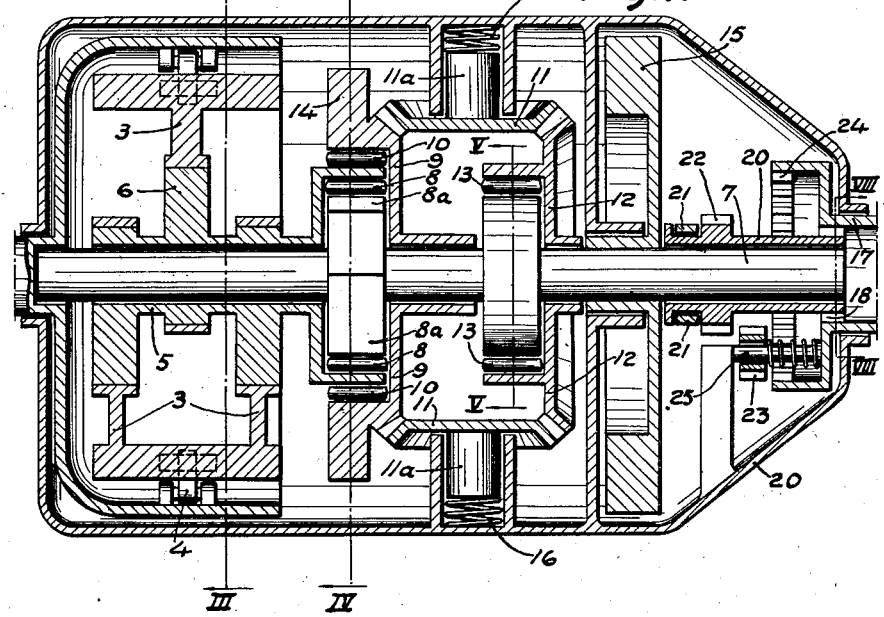
Fig. 1 is an axial section of an embodiment.

The sections according to Figs. 3–5 are taken along the lines III—III, IV—IV, and V—V of Fig. 1 respectively; the sections according to Figs. 6, 7 are taken along the lines VI—VI and VII—VII respectively of Fig. 2, and the section shown in Fig. 8 is taken along the line VIII—VIII of Fig. 1.

Fig. 9 is part of the apparatus in axial section, and on a larger scale.

In the embodiments shown, 1 indicates the driving shaft, 7 the driven shaft, 5 a sleeve (intermediate member), which is mounted about the shaft 7. 3 indicates the centrifugal weights, which by means of links 4 are connected to a carrier, which might be shaped as a flywheel mass, by means of which the centrifugal weights obtain their rotary motion from the driving shaft 1. The centrifugal weights are eccentrically mounted on the sleeve 5. The eccentrics themselves are indicated by 6. During operation the shaft 7 is, during the positive stroke of the centrifugal weights, actuated directly by the sleeve 5 so as to rotate in the direction of rotation by means of the check coupling 8. The shaft 7 is actuated so as to rotate in the direction of rotation by the sleeve 5, during the negative stroke of the centrifugal weights, through a primary check coupling 10 connected to a central conical toothed wheel 9, or another member transmitting the motion, of a transmission 9, 11, 12, in which the transmission member 12 by a secondary check coupling 13 actuates the driven shaft in the direction of rotation. The transmission members 9, 11, and 12, which, when operating, transmit the negative impulse from the centrifugal weights 3 through the sleeve 5, are free at direct coupling, and do not then participate in the rotatory motion.

All the check couplings 8, 10, and 13 are in the embodiment according to Fig. 1 single acting, with the check rolls permanently let in between the hooks 8a, 10a, 13a, and spring-actuated as shown in Figs. 4, 5, i. e. the couplings cannot be reversed so as to act checking in the direction opposite to that for which they are adapted as shown in the said Figures 4 and 5. The primary central conical toothed wheel or member 9 is provided with a flywheel mass 14. As shown in Fig. 1 (2) the toothed wheels or members 11 may be loaded by means of springs 16. In practice the shafts of the members may, if desired, be located in bearings, which are slidable in the longitudinal direction of the shaft 7 in order to be set in proper meshes. The secondary shaft, i. e. the driven shaft 7, is provided with a flywheel mass 15, the object of which is, in addition to storing energy for balancing the movement, also to balance the springing of the shaft 7 and the outgoing shaft 17 at the changes of the impulses from the centrifugal weights. The shaft 7 is connected with the shaft 17 by means of a lockable toothed coupling. The interior end portion of the shaft 17 is tubular, and the tube wall has a number of teeth 18, which cooperate with teeth 19 on a sleeve 20 (Fig. 8). This sleeve is slidable, but not rotatable on the shaft 7, and its teeth 19 may be brought in and out of engagement with the teeth 18 by the sleeve 20 being moved along the shaft by means of a common control gable, the legs 21 of which are visible in Fig. 1.

Further the apparatus has a reverse gear, which in the drawings is illustrated diagrammatically by a toothed wheel 22 rigidly connected to the sleeve 20, a pinion 23, and a toothed ring 24 in a drumlike elongation of the interior end of the shaft 17. The pinion 23 is mounted on a shaft 25 rigidly located in the casing 26. The reverse gear here described is adapted to alternate with the coupling 18, 19, in order to reverse the direction of motion of the shaft 17, thereby obtaining all the power transmission possibilities of the automatic gear also at reverse run.

If the check couplings are double acting, as described in connection with the following embodiment, the shaft 17 is omitted, and the direction of motion is reversed by the check couplings, and thus the reverse gear is unnecessary. For practical reasons, however, it is in certain cases advantageous to use single acting check couplings and reverse gear since the whole mechanism becomes simpler and more reliable.

The automatically variable change speed gear device in its whole operates as follows: The driving shaft 1 and the carrier 2, which might be formed as a flywheel mass, is brought into rotation by the source of power. The centrifugal weights 3, which are fixed on the member 2 by means of the links 4, and mounted on the eccentrics 6 of the sleeve 5, now begin to rotate about the eccentrics 6 until the centrifugal force of the centrifugal weights becomes so great that the eccentrics and the sleeve 5 are entrained in the motion in the direction of rotation or alternately to and fro.

If then the moment of resistance on the driven shaft 7 is higher than the centrifugal moment on the eccentrics 6 the centrifugal weights 3 are held locked by the centrifugal force in a certain outermost position, and the sleeve 5 rotates with the same speed as the member 2. At this the sleeve 5 is locked to the driven shaft 7 by the primary check coupling 8, whereby also the driven shaft 7 rotates with the same speed as the member 2. The driving and the driven shafts are in this case automatically directly coupled. If now the moment of resistance on the driven shaft 7 is increased so that the said moment becomes higher than the centrifugal moments on the eccentrics 6 the centrifugal weights 3 begin to turn over the center of the eccentrics 6, and the sleeve 5 and the driven shaft 7 decrease their speed relatively to the driving shaft 1. During their way upward toward the highest point of the eccentrics the centrifugal weights now endeavour to entrain the sleeve 5 and the shaft 7 in the direction of rotation during a certain period of the half stroke. During the opposite part of the stroke, when the centrifugal weights slide downward from the highest point of the eccentrics, the centrifugal weights endeavour to actuate the eccentrics to rotate in the opposite direction so that the sleeve 5 rotates opposite to the direction of rotation. When now the sleeve 5 rotates opposite to the direction of rotation the sleeve is locked at the central conical toothed wheel 9 by means of the secondary check coupling 10. The toothed wheel 9 now actuates the intermediate toothed wheels 11 to rotate, and the latter in their turn actuate the secondary central toothed wheel 12 so that the same rotates in the same direction as the driving shaft; by this the toothed wheel 12 is locked with the driven shaft 7 by means of the check coupling 13, and actuates the same to rotate in the direction of rotation during the negative stroke of the centrifugal weights 3. The reciprocating movement, which the centrifugal weights impart to the sleeve 5, increases or decreases according as the moment of resistance on the driven shaft decreases or increases. In the said way the automatic gearing is obtained. When the moment of resistance on the driven shaft decreases again to a certain value the sleeve 5 begins to rotate with the centrifugal weights 3 and entrains the shaft 7 by means of the check coupling 8, i. e. the shafts 1 and 7 are directly coupled. Now the check couplings 10 and 13 are free; hence it follows that the central toothed wheels 9 and 12 as well as the intermediate wheels 11 in no way participate in the rotary motion, but are at rest. In order, when gearing, to hold the toothed wheels 9, 11, and 12, which transmit the negative stroke to positive moment on the driven shaft, in a uniform motion and equal mesh, the toothed wheel 9 is provided with the flywheel mass 14. The object of the flywheel mass 15, on the other hand, is to balance springings in the shaft 7, which arise at the end of each impulse from the centrifugal weights. By means of the springs 16 free motion and shocks between the teeth are prevented. As is clear from the drawings the intermediate wheels 11 are directly mounted in the casing 26 (the frame). By alternatively mounting the wheels 11 slidably axially, as already mentioned, they center themselves automatically in relation to the intermediate position between the toothed wheels 9 and 12.

The embodiment shown in Fig. 2 deviates from the one already described among other things by the provision of a brake or checking device, by means of which one of the transmission wheels 9, 11, or 12, for instance the wheel 12, as shown in the drawings, may be locked by means of a brake band 28 so that instead of actuating the driven shaft the negative impulse actuates the driving shaft for accelerating the speed of the same. As shown in the drawings, the brake surface of the wheel 9 may be provided on the centrifugal mass 14. The brake band 28 is with one end fixed in stationary projections 28a on the inside of the drum 20. The other end is fixed in a rod 28b at some distance from the turning bolt 28c of the rod. For the rod there is a slot 28d in the wall of the drum, the wall being in the drawings shown curved in front of the rod. In practice this curvature becomes unnecessary. When braking, the rod is swung in the direction of the arrow.

Further this embodiment deviates from the one according to Fig. 1 by the provision of a single acting check coupling, for instance with check rollers 29 between the driving shaft 1 and the driven shaft 7, see also Fig. 6, by means of which the driven shaft is coupled with the driving shaft when the speed of the first-mentioned shaft endeavours to obtain a higher speed than the latter. Thus it becomes possible to brake the driven shaft by the motor in a known way. Finally this embodiment is provided with material for insulating the noise producing members from the surrounding members of the apparatus.

This insulating material, which may be an organic substance or a metal, such as lead, is shown in the drawings disposed between the casing 20 and the shaft bearings 30, 31, and 32, and is indicated by 33.

The check couplings 8, 10, and 13 respectively, which are provided with check rollers, may be single acting, as already described, or double acting. An embodiment with double acting checking devices 8, 10, and 13 is shown in Figs. 7 and 9. By reversing the rollers by means of the roller holders 34, 35 from the outermost position shown with full lines to the opposite position shown with dotted lines the direction of rotation of the driven shaft is evidently reversed. The same purpose may be obtained by making the checking devices 8 and 13 double acting, and the checking device 10 single acting.

For turning the roller holders from one outermost position to the other in double acting checking devices 8, 13, the device shown in Fig. 9 may be used. The rollers in the two couplings are provided at the same radial distance from the shaft 7. The two roller holders 34, 36 are connected mutually by members 37 and by a cam groove sleeve 38, which is rotatably located on the shaft 7. The grooves 39 of the sleeve, which are oblique or helical, as shown with the dashed lines at the underside of the shaft, are engaged by pins 40, which are secured in a ring 42. The said ring is by means of rods 43, which extend through the flywheel mass 15, connected with a member 44, which may be slidden on the shaft by means of a rod 45, which by a gable 46 grips the member. The roller holders 34, 36, the sleeve 38, the rods 43, and the member 55 rotate synchronously with the shaft 7.

When displacing the member 44 by means of the rod 45, which is rotatable about an axle spindle 47, the sleeve 38 is rotated by the action of the pins 40, whereby the roller holders are reversed. In order to give the pins and the ring the necessary rectilinear guidance there are axial grooves 50 on the shaft 7.

As to possible variations in the construction of the described apparatus it may be mentioned that instead of the toothed wheels 9, 11, and 12, friction disks or disks having roller paths adapted for transmitting the motion may be used.

Having now described my invention, what I claim as new and desire to secure by Letters Patent is:

1. In an automatically variable change speed gear device a driving shaft, a driven shaft, said driving shaft being provided with centrifugal weights actuating the driven shaft by positive and negative impulses, said device being provided with a primary check coupling for transmitting the positive impulse to the driven shaft, and another primary and a secondary coupling for separately transforming the negative impulse into a positive impulse and for transmitting said negative impulse to the driven shaft the first mentioned check coupling being arranged to transmit power from the driving shaft to the driven shaft by direct coupling thereby setting the other two couplings out of function.

2. In an automatically variable change speed gear device a driving shaft, a driven shaft, said driving shaft being provided with centrifugal weights actuating the driven shaft by positive and negative impulses, said device being provided with a primary check coupling for transmitting the positive impulse to the driven shaft, and another primary and a secondary coupling and gearing to transform the negative impulse into a positive impulse and transmit said negative impulse to the driven shaft the first mentioned check coupling being arranged to transmit power from the driving shaft to the driven shaft at direct coupling thereby setting the other two couplings out of function the last mentioned two check couplings including motion transmitting members for transforming the negative impulses into positive impulse.

3. In an automatically variable change speed gear device a driving shaft, a driven shaft, said driving shaft being provided with centrifugal weights actuating the driven shaft by positive and negative impulses, said device being provided with a primary check coupling for transmitting the positive impulse to the driven shaft, and another primary and a secondary coupling for transforming the negative impulse into a positive impulse and for transmitting said transformed impulse to the driven shaft the first mentioned check coupling being arranged to transmit power from the driving shaft to the driven shaft at direct coupling thereby setting the other two couplings out of function the last mentioned two check couplings including motion transmitting members for transforming the negative impulses into positive impulse, and a brake acting upon said last mentioned couplings by means of which the said members may be braked and locked for directing the negative impulse to the driving shaft in order to accelerate the speed of the same.

4. In an automatically variable change speed gear device a driving shaft, a driven shaft, said driving shaft being provided with centrifugal weights actuating the driven shaft by positive and negative impulses, said device being provided with a check coupling between the driving and the driven shaft separately transforming the negative impulse into a positive impulse and transmitting said positive impulse to the driven shaft and, including one way checking means for connecting the two shafts to each other when the driven shaft tends to attain a higher speed than the driving one.

5. In an automatically variable change speed gear device a driving shaft, a driven shaft, said driving shaft being provided with centrifugal weights actuating the driven shaft by positive and negative impulses, said device being provided with a primary check coupling for transmitting the positive impulse to the driven shaft, and another primary and a secondary coupling for transforming the negative impulse into a positive impulse and for transmitting said negative impulse to the driven shaft the first mentioned check coupling being arranged to transmit power from the driving shaft to the driven shaft at direct coupling thereby setting the other two couplings out of function the last mentioned two check couplings including motion transmitting members for transforming the negative impulses into positive impulse, the device including insulating means for noise producing members of the device.

6. In an automatically variable change speed gear device a driving shaft, a driven shaft, said driving shaft being provided with centrifugal weights actuating the driven shaft by positive and negative impulses, said centrifugal weights being eccentrically mounted on a sleeve located about the driven shaft and connected to the driven shaft by means of a check coupling for transmitting the primary impulse to the driven shaft, and connected to a gear by means of a second check coupling for transforming the negative impulse to a positive impulse, said gear being connected to the driven shaft by means of a third check coupling for transmitting the transformed negative impulse as a positive impulse to the driven shaft.

7. In an automatically variable change speed gear device a driving shaft, a driven shaft, said driving shaft being provided with centrifugal weights actuating the driven shaft by positive and negative impulses, said centrifugal weights being eccentrically mounted on a sleeve located about the driven shaft and connected to the driven shaft by means of a check coupling for transmitting the positive impulse to the driven shaft, and connected to a gear by means of a second check coupling for transforming the negative impulse to a positive impulse, said gear being connected to the driven shaft by means of a third check coupling for transmitting the transformed negative impulse as a positive impulse to the driven shaft, one of the gear wheels being provided with a braking surface adapted to cooperate with a brake.

8. In an automatically variable change speed gear device a driving shaft, a driven shaft, said driving shaft being provided with centrifugal weights actuating the driven shaft by positive and negative impulses, said device being provided with a primary check coupling for transmitting the positive impulse to the driven shaft, and another primary and a secondary coupling for transforming the negative impulse into a positive impulse and for transmitting said transformed impulse to the driven shaft the first mentioned check coupling being arranged to transmit power form the driving shaft to the driven shaft at direct coupling thereby setting the other two couplings out of function, the last mentioned two check couplings, including motion transmitting members for transforming the negative impulse into positive impulse, said device being provided with a check coupling between the driving and the driven shaft, including one way checking means for connecting the two shafts directly to each other when the driven shaft tends to attain a higher speed than the driving one.

9. In an automatically variable change speed gear device a driving shaft, a driven shaft, said driving shaft being provided with centrifugal weights actuating the driven shaft by positive and negative impulses, said centrifugal weights being eccentrically mounted on a sleeve located about the driven shaft and connected to the driven shaft by means of a check coupling for transmitting the primary impulse to the driven shaft, and connected to a gear by means of a second check coupling for transforming the negative impulse to a positive impulse, said gear being connected to the driven shaft by means of a third check coupling for transmitting the transformed negative impulse as a positive impulse to the driven shaft, springs by holding the gear wheels in contact with each other.

10. In an automatically variable change speed gear device a driving shaft, a driven shaft, said driving shaft being provided wtih centrifugal weights actuating the driven shaft by positive and negative impulses, said centrifugal weights being eccentrically mounted on a sleeve located about the driven shaft and connected to the driven shaft by means of a check coupling for transmitting the primary impulse to the driven shaft, and connected to a gear by means of a second check coupling for separately transforming the negative impulse to a positive impulse, said gear being connected to the driven shaft by means of a third check coupling for transmitting the transformed negative impulse as a positive impulse to the driven shaft, the check couplings being two way acting ones and the checking means including reversible rollers, by means of which the direction of motion of the driven shaft is reversed.

11. In an automatically variable change speed gear device a driving shaft, a driven shaft, said driving shaft being provided with centrifugal weights actuating the driven shaft by positive and negative impulses, said centrifugal weights being eccentrically mounted on a sleeve located about the driven shaft and connected to the driven shaft by means of a check coupling for transmitting the primary impulse to the driven shaft, and connected to a gear by means of a second check coupling for transforming the negative impulse to a positive impulse, said gear being connected to the driven shaft by means of a third check coupling for transmitting the transformed negative impulse as a positive impulse to the driven shaft, the check couplings being one way acting ones and the checking means including rollers which are spring actuated in one direction, the device including a reverse gear and a transmission shaft adapted to transmit the motion from the driving shaft to the driven one, when the direction of motion of the latter is reversed.

12. In an automatically variable change speed gear device a driving shaft, a driven shaft, said driving shaft being provided with centrifugal weights actuating the driven shaft by positive and negative impulses, said centrifugal weights being eccentrically mounted on a sleeve located about the driven shaft and connected to the driven shaft by means of a check coupling for transmitting the primary impulse to the driven shaft, and connected to a gear by means of a second check coupling for transforming the negative impulse to a positive impulse, said gear being connected to the driven shaft by means of a third check coupling for transmitting the transformed negative impulse as a positive impulse to the driven shaft, said second check coupling being single acting and said third check coupling being double acting.

13. The device as claimed in claim 12 wherein the primary check coupling for transmitting the positive impulses and the secondary check coupling being adapted to be operated in common when reversing the direction of motion, while simultaneously the primary check coupling for transmitting the negative impulses is locked in order that the negative impulses may be transmitted to the driving shaft.

14. An automatically variable change speed device comprising a drive shaft, a driven shaft and means for transmitting motion from the one to the other including an eccentric sleeve rotatably mounted on the driven shaft, means for imparting a to and fro motion to said eccentric sleeve, a primary coupling for transmitting one of said motions as a rotary motion to the driven shaft and a second coupling and gearing for transmitting the other of said motions to the driven shaft, said transmission couplings being so constructed and arranged that one is stationary while the other is active.

DAVID WERNER BERLIN.